(12) United States Patent
Santangelo

(10) Patent No.: US 11,835,091 B2
(45) Date of Patent: Dec. 5, 2023

(54) BEARING UNIT HAVING A HIGH-PERFORMANCE RETENTION DEVICE

(71) Applicant: AKTIEBOLAGET SKF, Gothenburg (SE)

(72) Inventor: Piero Santangelo, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/502,158

(22) Filed: Oct. 15, 2021

(65) Prior Publication Data

US 2022/0120318 A1 Apr. 21, 2022

(30) Foreign Application Priority Data

Oct. 16, 2020 (IT) .......................... 102020000024403

(51) Int. Cl.
*F16C 33/38* (2006.01)
*F16C 33/41* (2006.01)

(52) U.S. Cl.
CPC ...... *F16C 33/3887* (2013.01); *F16C 33/3875* (2013.01); *F16C 33/3881* (2013.01); *F16C 33/41* (2013.01); *F16C 2226/74* (2013.01)

(58) Field of Classification Search
CPC .............. F16C 33/3875; F16C 33/3881; F16C 33/3887; F16C 33/41; F16C 33/412; F16C 33/418; F16C 2226/74
See application file for complete search history.

(56) References Cited

U.S. PATENT DOCUMENTS

2017/0108043 A1 4/2017 Mocnik et al.

FOREIGN PATENT DOCUMENTS

| JP | 2005180666 A | * | 7/2005 | ............ F16C 33/412 |
| JP | 2005180666 A | | 7/2005 | |
| JP | 2007040383 A | * | 2/2007 | .......... F16C 33/3875 |
| JP | 2007040383 A | | 2/2007 | |
| JP | 2009275799 A | * | 11/2009 | .......... F16C 33/3875 |
| JP | 2009275799 A | | 11/2009 | |
| JP | 2015017710 A | | 1/2015 | |
| KR | 20190102670 A | | 9/2019 | |

OTHER PUBLICATIONS

Machine Translation of JP-2005180666-A (Year: 2005).*
Machine Translation of JP-2007040383-A (Year: 2007).*
(Continued)

*Primary Examiner* — Alan B Waits
(74) *Attorney, Agent, or Firm* — J-TEK LAW PLLC; Scott T. Wakeman; Mark A. Ussai

(57) ABSTRACT

A bearing unit includes a radially outer ring, a radially inner ring, a row of rolling bodies interposed between the radially outer ring and the radially inner ring and a cage for retaining the rolling bodies, where the cage includes a rib with a circular base and a plurality of circumferentially spaced fingers defining a plurality of pockets for holding the respective rolling bodies of the row of rolling bodies. Also, a plurality of inserts formed separately from the cage, each of the plurality of inserts being inserted inside seats of corresponding adjacent pairs of fingers of the plurality of fingers to limit circumferential deformation of the fingers.

3 Claims, 2 Drawing Sheets

(56) References Cited

OTHER PUBLICATIONS

Machine Translation of JP-2009275799-A (Year: 2009).*
Written Opinion and Search Report from Italian patent Office dispatched Jun. 23, 2021 in related application No. 102020000024403, and translation thereof.
Written Opinion and Search Report from the French Patent Office dated Feb. 28, 2023 in related French application No. FR2110946, and translation thereof.

* cited by examiner

BEARING UNIT HAVING A HIGH-PERFORMANCE RETENTION DEVICE

CROSS-REFERENCE

This application claims priority to Italian patent application no. 10 2020 000 024 403 filed on Oct. 16, 2020, the contents of which are fully incorporated herein by reference.

TECHNOLOGICAL FIELD

The present invention relates to a bearing unit provided with a high-performance retention device. The retention device has innovative features that allow good retention of the rolling bodies of bearing units at high speed and at high temperature and is suitable for electric motors, alternators and in general for assemblies that have a bearing unit.

BACKGROUND

According to the conventional art, a cage for rolling bodies, especially balls, of a bearing unit is formed from a rib with a circular base and a plurality of circumferentially spaced fingers that extend from one side of the rib. The base rib and the fingers have partially spherical concave surfaces, together defining a plurality of partially spherical pockets or cavities for retaining said balls.

Conventional cages, which may be made of a polymer material, have performance limitations both in terms of rotary speed of the bearing unit and in terms of operative working temperature. In fact, at high speeds (for example, for rotary speeds close to 20000 rev/min), owing to the centrifugal force, the fingers forming the cavities for housing the balls tend to "open up" which lessens the retention of the balls. The results are a) the cage is expelled from its seating and is destined for probable breakage, b) probable expulsion of the balls from their seats, and c) consequent loss of function of the bearing.

A similar problem arises due to high operating temperatures, or through the combined effect of high speed and high temperature. For example, in conditions with a rotary speed close to 20000 rev/min and temperatures around 150° C., the radial deformation of the cage is of such an extent that the cage will rub against the radially outer ring of the bearing unit.

To overcome this limitation, it might be possible to use special materials, for example metallic materials. However, this solution is not feasible because such materials are very expensive and the speed advantages are still limited: at high speeds, in fact the metallic material makes the cage too noisy.

There is therefore a need to design a retention device for rolling bodies (in particular, balls) of bearing units that is free from the aforementioned drawbacks. In other words it is necessary to ensure an adequate force of retention of the rolling elements in conditions of high speed and/or high operating temperatures.

SUMMARY

The present disclosure is directed to a bearing unit provided with a retention device for the rolling bodies that is able to operate in conditions of high rotary speed and/or high temperature without a risk of loss of retention of the rolling bodies.

According to a first aspect, the retention device comprises a cage made of a polymer material and a plurality of inserts, also made of polymer material, which when coupled to the cage react to the forces acting on the fingers of the cage, thus preventing them from opening.

In a second aspect, the retention device is made in two parts and comprises a cage and an insert holder, the latter provided with a plurality of inserts integral therewith, which when coupled to the cage react to the forces acting on the fingers of the cage, preventing them from opening.

BRIEF DESCRIPTION OF THE DRAWINGS

The disclosure will now be described with reference to the appended drawings, which illustrate some non-limiting embodiment examples thereof, in which.

DETAILED DESCRIPTION

Purely for purposes of illustration and not for limiting the present invention (which is defined by the appended claims), embodiments of the present invention will now be described in association with a generic bearing unit provided with the inventive retention cage.

Figure 1:
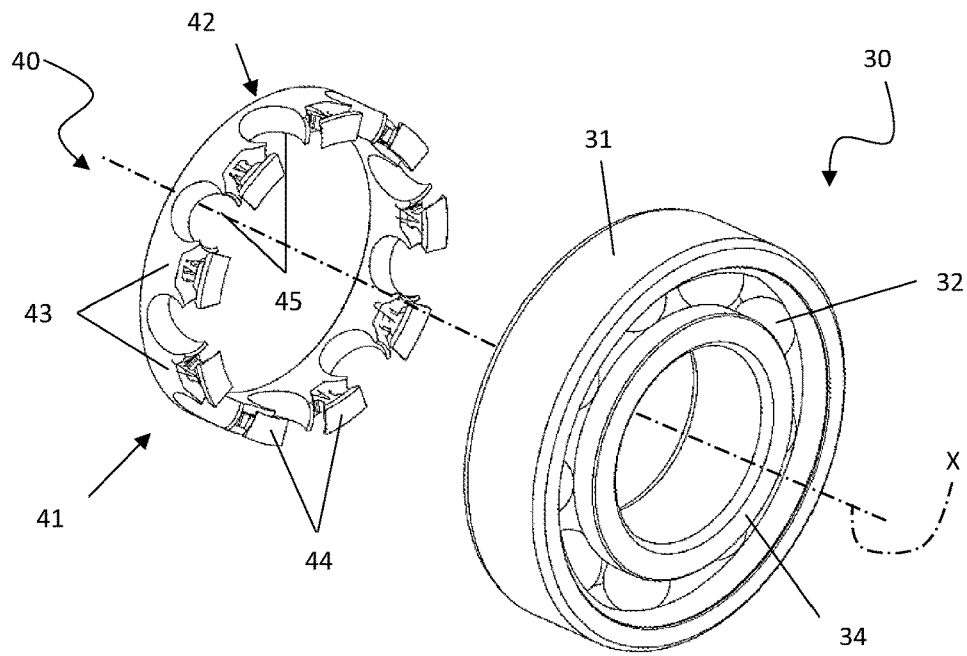
FIG. 1 is an exploded perspective view of a bearing unit comprising a retention device provided with inserts for improving the retention of the rolling bodies according to a first embodiment.

Referring to FIG. 1, the bearing unit 30 comprises a radially outer ring 31, a radially inner ring 34, a row of rolling bodies 32, in this example balls, interposed between the radially outer ring 31 and the radially inner ring 34, and a retention device 40 for keeping in position the rolling bodies 32.

Throughout the present description and in the claims, the terms and the expressions indicating positions and orientations such as "radial" and "axial" refer to the central axis of rotation X of the bearing unit 30, unless stated otherwise.

The retention device 40, according to a first embodiment of the invention, is made of polymer material and comprises: a cage 41 comprising a rib 42 with a circular base and a plurality of fingers spaced circumferentially that extend from one side of the rib 42, and a plurality of inserts 44 of prismatic shape.

The base rib 42 and the fingers 43 have partially spherical concave surfaces, together defining a plurality of pockets 45 or partially spherical cavities for retaining respective balls by means of contact zones. Therefore the cage 41 is similar to the conventional cages.

Figure 2:
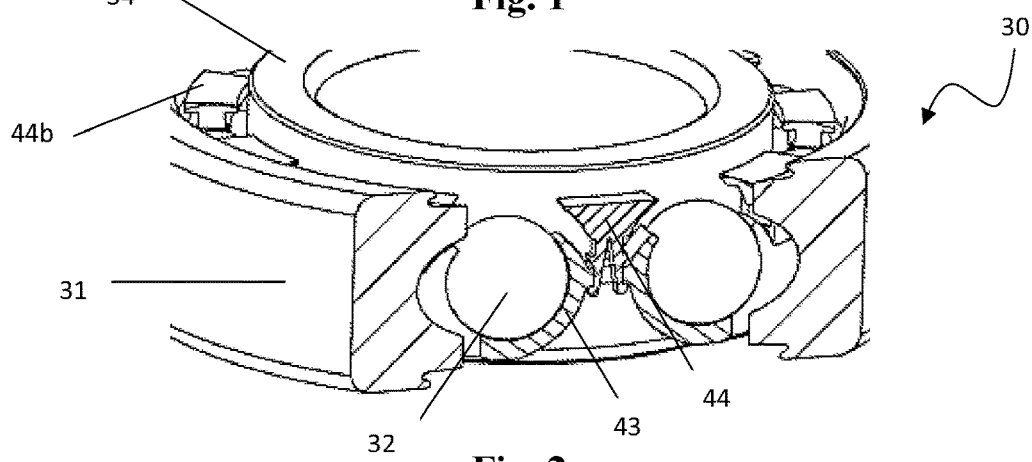
FIG. 2 is a partial sectional perspective view of the bearing unit of FIG. 1 with the inserts in a first configuration of coupling to the retention cage.
Figure 3:
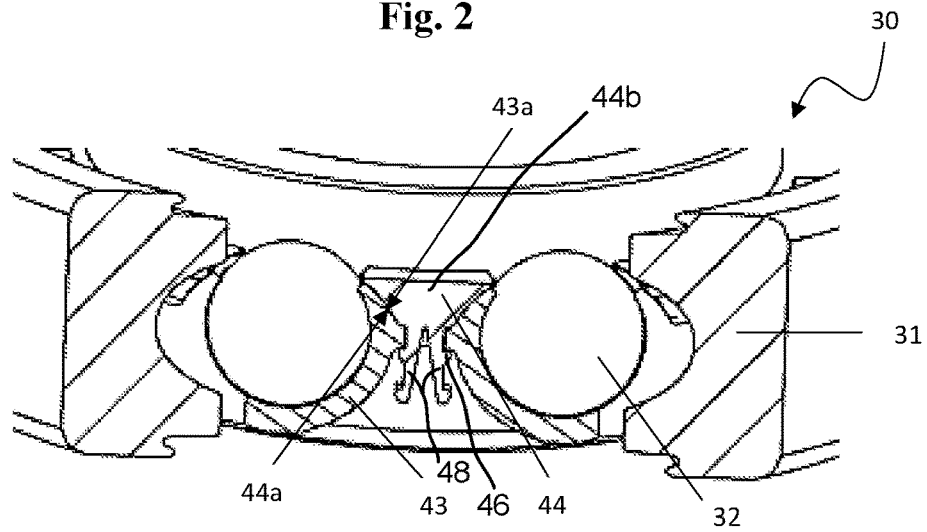
FIG. 3 is a partial sectional perspective view of the bearing unit provided with the retention device from FIG. 1 with the inserts in a second configuration of coupling to the retention cage.

The method of mounting this retention device 40 includes the assembly of the cage 41 in the bearing unit 30. This is followed by mounting of each of the inserts 44 of the plurality of inserts in corresponding seats made in the fingers 43 of the cage 41. FIG. 2 illustrates an insert 44 in a first preassembly position. Then, referring to FIG. 3, each of the inserts 44 is then pushed inside the corresponding seat of the fingers 43 so as to reach a second, final assembly position. After this insertion, a stop 46 with a stop surface configured to contact the fingers prevents the inserts 44 from being removed in a direction opposite the direction of insertion. Preferably, the coupling system between the inserts 44 and the corresponding seats of the fingers 43 of the cage 41 consists of a snap-fitting solution, although other coupling solutions may also be envisaged. To produce the snap fit, each of the inserts 44 includes a body portion 44b and a pair of tongues 48 that extend from the body portion 44b. The tongues 48 are configured to flex toward one another to allow the tongues to pass between an adjacent pair of the fingers 43 and then return to their original positions to secure the inserts between the fingers 43.

Once coupling has been effected, each of the inserts 44 is configured for exerting a stop action against the corresponding finger 43. This stop action is effected by means of an oblique surface 44a of the insert 44 with respect to a corresponding oblique surface 43a of the finger 43 of the cage 41, the surface 44a of the insert and the surface 43a of the finger having the same inclination. More precisely, each insert of the plurality of inserts 44 comprises a pair of oblique surfaces 44a that engage with a pair of oblique surfaces 43a of corresponding fingers of the plurality of fingers 43 of the cage 41. The surfaces 44a of the insert 44 are able to absorb the stresses, typically in the radial and/or tangential direction, that the bearing unit 30 transmits to the cage 41. Therefore the fingers 43 of the cage 41 are unable to deform by widening, owing to centrifugal forces and/or thermal expansion, and maintain their ability to retain the rolling bodies 32 of the bearing unit 30.

Advantageously, referring again to FIG. 2, the inserts 44 are provided with an end edge 44b that strengthens the structure of the insert, facilitating the stop action it exerts on the fingers 43.

Figure 4:
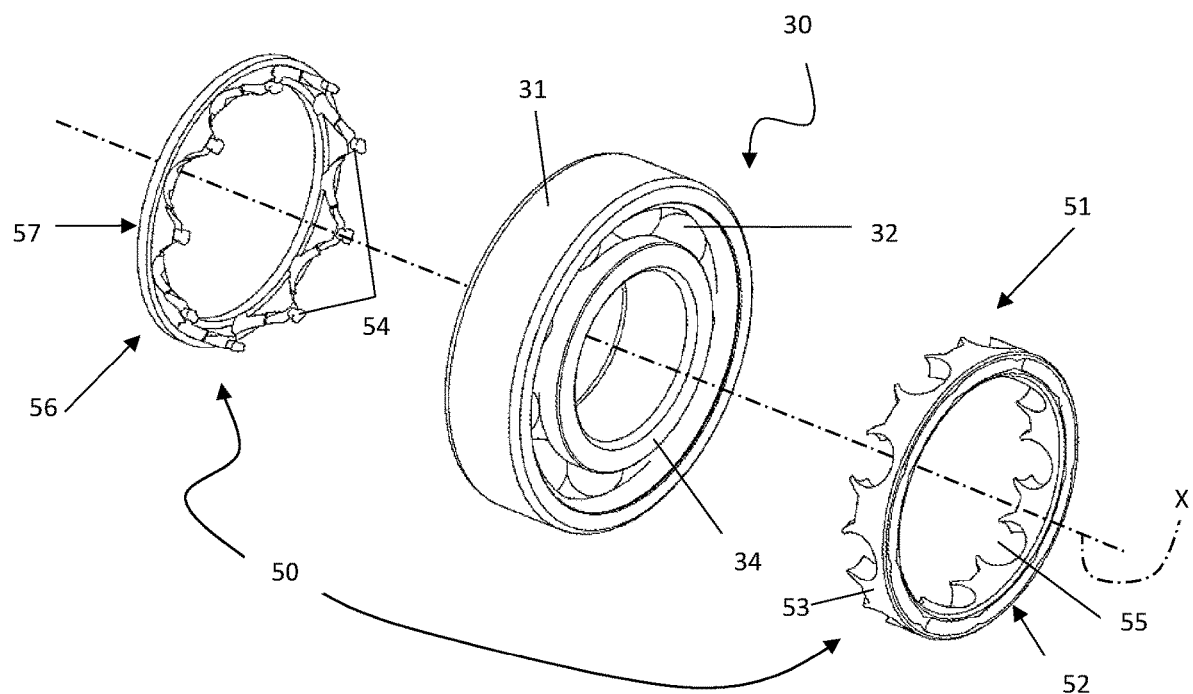
FIG. 4 is an exploded perspective view of a bearing unit comprising a retention device provided with inserts and an associated insert holder for improving the retention of the rolling bodies, in a second embodiment of the present disclosure.

Referring to FIG. 4, a second embodiment of the disclosure will now be described. The retention device 50 is made of polymer material and comprises: a cage 51 including a rib 52 with a circular base and a plurality of fingers 53 spaced circumferentially that extend from one side of the rib 52, and an insert holder 56 of prismatic shape.

As in the preceding configuration, the base rib 52 and the fingers 53 have partially spherical concave surfaces that together define a plurality of pockets 55 or partially spherical cavities for retaining respective balls by way of contact zones. The cage 51 is otherwise completely identical to the cage 41 of the preceding configuration, and thus also represents a substantially conventional cage.

The insert holder 56 comprises a rib 57 with a circular base and a plurality of inserts 54 integral with the rib 57 and of almost identical conformation to the inserts 44 of the configuration described above.

Therefore the insert holder 56 has a suitable geometry that guarantees, once assembled, retention of the balls by the cage 51.

Figure 5:
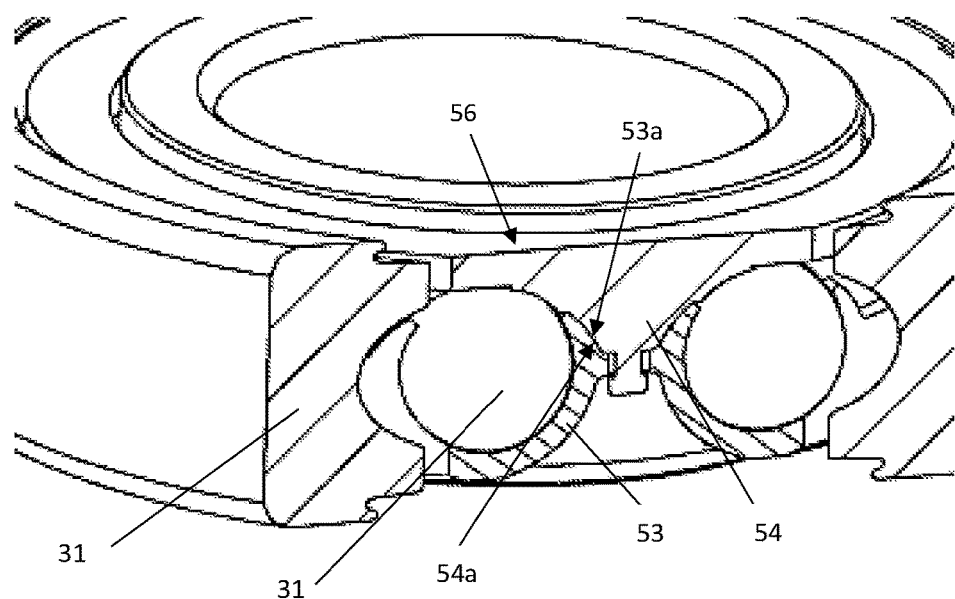
FIG. 5 is a partial sectional perspective view of the bearing unit provided with the retention device of FIG. 4.

Referring to FIG. 5, the method of assembly of this retention device 50 comprises assembly of the cage 51 in the bearing unit 30 and then assembling the insert holder 56 with the cage 51 by coupling the inserts 54 in suitable seats defined by and between the fingers 53 of the cage 51.

Once coupled, each of the inserts 54 is configured for exerting a stop action on the corresponding finger 53. This stop action is effected, as in the preceding configuration, by means of an oblique surface 54a of the insert 54 with respect to a corresponding oblique surface 53a of the finger 53 of the cage 51, the surface 54a of the insert and the surface 53a of the finger having the same inclination. More precisely, each insert of the plurality of inserts 54 comprises a pair of oblique surfaces 54a that engage with a pair of oblique surfaces 53a of corresponding fingers of the plurality of fingers 53 of the cage 51. The surfaces 54a of the insert 54 are able to absorb the stresses, typically in the radial and/or tangential direction, that the bearing unit 30 transmits to the cage 51. Therefore the fingers 53 of the cage 51 are unable to deform by widening, owing to centrifugal forces and/or thermal expansion, and maintain their ability to retain the rolling bodies 32 of the bearing unit 30.

An advantage of implementing this second configuration with a one-piece insert holder 56 is that it creates greater rigidity for the structure of the whole retention device 50, more effectively preventing expansion and opening of the fingers 53 of the cage 51.

The operating principle of these retention devices, at high speed and at high temperature, is as follows: the cage is entrained by the rolling bodies and, in addition, the capacity for retention is increased by the presence of the inserts 44, 54, mounted individually or by means of the insert holder 56, which block the fingers of the cage, preventing any widening thereof.

The retention device according to the disclosure, once mounted, does not run any risk of being pulled out of its seating, and offers greater rigidity for any speeds.

Preferably, the process of assembly of the retention device is facilitated if a snap-fitting solution is used for the coupling between the inserts and the finger seats of the cage.

Moreover, according to the present disclosure, the weight of the retention device is better distributed around the center of gravity of the rolling bodies compared to a conventional polymer cage without the disclosed inserts.

This retention device thus makes it possible to use the bearing unit in all applications requiring performance at high speed and/or at high temperature, avoiding the use, for these performance applications, of metal cages which, besides being more expensive, also become very noisy at high speed.

Theoretical and experimental findings have demonstrated that at 30000 rev/min the fingers of the socket cage "open" only by 0.24 mm, yet provide excellent retention of the rolling bodies, and the whole retention device remains in its assembly position even at high speed.

Moreover, operating at 30000 rev/min but also at high temperatures, for example at 150° C., the radial deformation of the cage is only 0.38 mm. The result is that the cage remains in position without rubbing on the radially outer ring even at high speeds and high temperatures.

Besides the embodiments of the invention described above, it has to be understood that there are numerous further variants. It must also be understood that these embodiments are only for purposes of illustration, and do not limit the scope of the invention, nor its applications, nor its possible configurations. Conversely, although the description given above makes it possible for a person skilled in the art to implement the present invention at least according to its exemplary configuration, it has to be understood that numerous variations of the components described are conceivable, without going beyond the scope of the invention, as defined in the appended claims, interpreted literally and/or according to legal equivalents thereof

What is claimed is:
1. A bearing unit comprising:
  a radially outer ring, a radially inner ring, a row of rolling bodies interposed between the radially outer ring and the radially inner ring, a cage for retaining the rolling bodies, the cage including a rib with a circular base and a plurality of circumferentially spaced fingers defining a plurality of pockets for holding the respective rolling bodies of the row of rolling bodies, and a plurality of inserts formed separately from the cage, each of the plurality of inserts being inserted inside seats of corresponding adjacent pairs of fingers of the plurality of fingers to limit circumferential deformation of the fingers, wherein each insert of the plurality of inserts comprises a pair of oblique surfaces which engage with a pair of oblique surfaces of corresponding fingers of the plurality of fingers of the cage, the pair of surfaces of the insert and the pair of surfaces of the fingers having a same inclination, wherein each of the adjacent pairs of fingers is spaced apart by a distance, wherein each of the inserts includes a body having the oblique surfaces and a pair of tongues extending from the body, each of the tongues having a distal end, wherein a separation of the distal ends is greater than the distance when no force is applied to the tongues, wherein the tongues are configured to be elastically flexed toward each other such that a separation between the distal ends is less than or equal to the first width, and wherein the tongues include a stop surface configured to prevent the inserts from being axially removed from the between the adjacent pairs of fingers without deforming the tongues.

2. The bearing unit according to claim 1, wherein the inserts are configured to attach to the bearing cage in a first axial direction and wherein the stop surfaces are configured to resist the inserts from separating from the cage in a second axial direction opposite the first axial direction.

3. The bearing unit according to claim 1, wherein each of the plurality of inserts is configured to connect to the bearing cage with a snap connection.

\* \* \* \* \*